(No Model.)
J. S. KLEIN.
DEVICE FOR HEATING OIL.
No. 306,837. Patented Oct. 21, 1884.
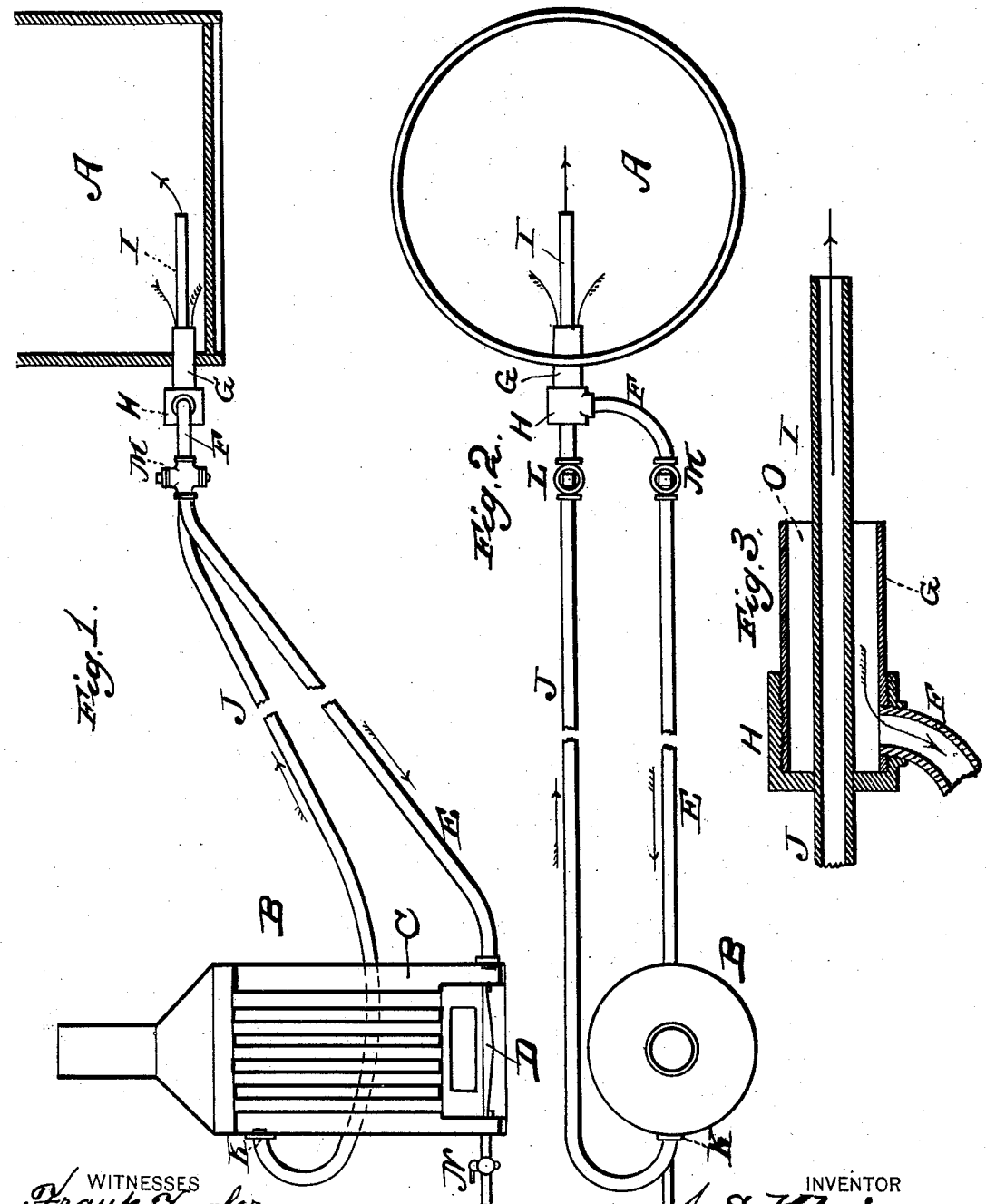
WITNESSES
Frank Fowler
Thomas W. Beale
INVENTOR
J. S. Klein
by Wm. H. Bates and Co.
his ATTORNEYS

UNITED STATES PATENT OFFICE.

JOHN S. KLEIN, OF OIL CITY, PENNSYLVANIA.

DEVICE FOR HEATING OIL.

SPECIFICATION forming part of Letters Patent No. 306,837, dated October 21, 1884.

Application filed May 14, 1884. (No model.)

*To all whom it may concern:*

Be it known that I, JOHN S. KLEIN, a citizen of the United States, residing at Oil City, in the county of Venango and State of Pennsylvania, have invented certain new and useful Improvements in Devices for Heating Oil, of which the following is a specification, reference being had therein to the accompanying drawings.

This invention has relation to improvements in devices for heating petroleum; and it consists in the novel arrangement of the same, whereby the oil is carried from the tank to a heating-drum, where it is heated and again returned to the tank, all of which will be hereinafter more fully explained, and particularly pointed out in the claims appended.

The annexed drawings, to which reference is made, fully illustrate my invention, in which Figure 1 represents a vertical sectional view of my device, and Fig. 2 is a plan view of the same. Fig. 3 is a sectional detail view.

Referring by letter to the accompanying drawings, A designates the oil-tank, of ordinary construction, and B indicates a furnace, having a drum or receptacle, C, below which is the furnace-grate D. Connected to the lower portion of this receptacle C is a pipe, E, the end F of which is connected to a pipe, G, which is provided with a coupling, H, through which pipe G and coupling is passed the end I of a second pipe, J, which extends to the furnace and is connected at the upper portion of the receptacle C, as shown at K in the drawings. These pipes are each provided with stop-cocks L and M.

Having described the construction of my device, I will now explain its operation. The oil in the tank flows through the pipe F and enters the receptacle C at the lower portion thereof, when the same is heated by the furnace, after which the same passes out of the upper end of the receptacle through the pipe J, and passes out the end I into the lower portion of the tank, as shown by the arrows in Fig. 1, thus rendering the oil less viscid and permitting the oil to flow freely from the tank. The water may be drawn off at the drip-cock N, or allowed to return to the tank and be drawn off from the bottom thereof, and the pure oil may be drawn from the bottom of the tank, the water being first drawn off by the drip-cock. The heating of the oil causes the water to settle at the bottom of said tank and be drawn off, as above stated. It will be observed that the cold oil entering the pipe G passes through the annular space O, passes through the pipe E to the heating apparatus, and, being there heated, tends to rise and pass out through the pipe J back to the tank, and discharges the same near the center of the tank, where it mingles with the cold oil, thereby warming all the oil in said tank.

The heating apparatus should be placed as much lower than the bottom of the tank as circumstances will permit, as the difference in gravity of the cold and hot oil gives the effective head and causes the circulation. Where this difference of level cannot be obtained, the heated oil should be admitted to the tank about midway between the top and bottom. The greater the vertical distance from bottom of heating receptacle and the top of fluid in tank the more rapid will be the circulation. Should any slush, ice, or very thick oil obstruct the passage through the pipe having the annular space, the hot oil will throw it as the same passes through the pipe J, so that the circulation will not be interfered with.

Instead of the furnace shown in Fig. 1 of the drawings, I may construct a furnace to receive a coil-pipe to which the two pipes may connect. When there is no slush or ice, the oil can be given a more rapid circulation by returning the heated oil to the tank about midway between the top and bottom thereof by connecting the return-pipe thereto instead of connecting it to the second pipe, and in some cases the return-pipe may enter the tank about three feet above the bottom thereof.

Suitable connections may be made with the receptacle or either of the pipes for burning the oil in heating the same.

What I claim is—

In an apparatus for heating oil, the combination, with the tank A, furnace B, and chamber C, said tank being elevated above the chamber C, of the pipes E J and coupling G, the pipe J terminating near the top and pipe E terminating at the lower end of the chamber C, the opposite ends F I of said pipes being connected to and branching off from the coupling-pipe G, the whole constructed and arranged in the manner herein shown and described.

In testimony whereof I affix my signature in presence of two witnesses.

JOHN S. KLEIN.

Witnesses:
 N. I. SHUGERT,
 WILLIAM E. CARR.